March 12, 1968   D. S. FAULKNER   3,372,413
NAIL-MAKING MECHANISM AND TECHNIQUE
Filed Aug. 6, 1965   4 Sheets-Sheet 3

INVENTOR
Douglas S. Faulkner

BY Lane, Aitken, Dunner & Ziems
ATTORNEYS

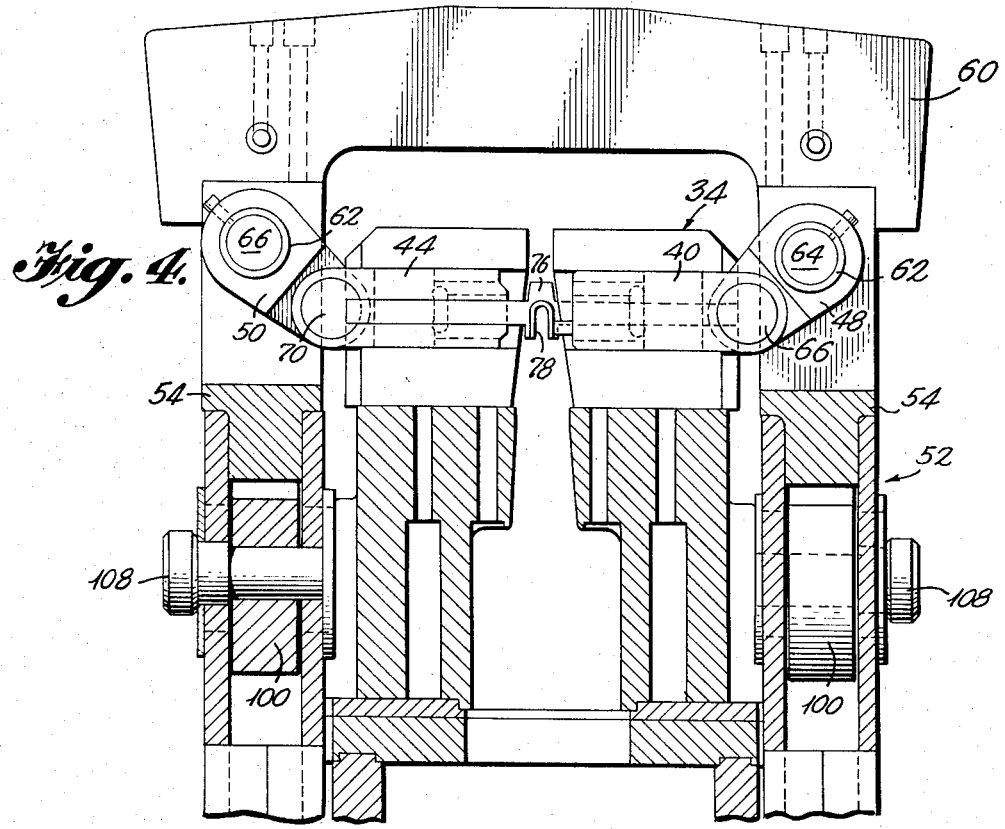
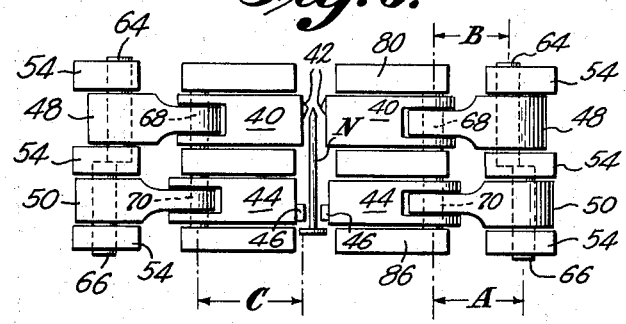

United States Patent Office 3,372,413
Patented Mar. 12, 1968

3,372,413
NAIL-MAKING MECHANISM AND TECHNIQUE
Douglas Stewart Faulkner, Warrington, England, assignor to The Dore Development Company, Inc., Elmhurst, N.Y., a corporation of New York
Filed Aug. 6, 1965, Ser. No. 477,920
Claims priority, application Great Britain, Aug. 15, 1964, 33,427/64
8 Claims. (Cl. 10—54)

ABSTRACT OF THE DISCLOSURE

An apparatus and method for manufacturing nails, rivets and the like, wherein a length of wire nail stock is pointed and cut by a cutting tool and then gripped by a gripping tool while a head is formed on the cut length.

---

In United States Patent 2,696,013 and British Patent No. 715,433 published Sept. 15, 1954 (the disclosures of which are hereby incorporated herein by reference) is described an improved machine and method for the production of wire nails. The mechanism of this improved machine includes the combination of cooperative wire cutting and pointing dies, cooperative wire grippers actuated after operation of said dies so as then to grip the pointed wire length cut off by said dies, and means for heading said wire length while gripped by said grippers. This mechanism and method for producing wire nails is to be distinguished from the conventional nail-making machine wherein the wire end is first headed, a predetermined length of said headed wire being then fed past a cutting off station and the operation of cutting and pointing dies thereafter taking place at said station.

The particular arrangement of the nail-making mechanism illustrated and described in said U.S. Patent 2,696,013 and said British Patent 715,433 includes a first fixed member attachable to the bolster element of a power press and a second member reciprocally mounted with respect to said first member and attachable to the ram element of a power press. Slidably mounted in the first member for movement towards and away from one another are a pair of opposed cutter slide members and a pair of opposed gripper slide members, said pairs of slide members being suitably connected to the second member so that their sliding movements are synchronized with one another upon reciprocation of the second member. The particular means by which reciprocation of the second member is translated into sliding movement of the cutter and gripper slide members is illustrated in said U.S. and British patents to be a toggle link mechanism.

The present invention provides a distinct improvement over the operation of the mechanism of said U.S. and British patents through an arrangement which is designed not only to improve the quality of the nail produced but to speed up considerably the rate of nail production of the mechanism and to increase its overall efficiency of operation. This significant improvement in operation is effectuated through a novel means arranged to provide a relatively short cutting and pointing period and a relatively longer gripping period.

It is accordingly a primary object of the present invention to provide an improved nail-making mechanism and process for improving the quality of nail produced and to speed up the rate of nail production and the efficiency of operation of the machine.

It is another principal object of the present invention to provide an improved nail-making mechanism and process which accomplishes important advantages through means arranged to give a relatively short cutting and pointing period and a relatively longer gripping period.

It is a further object of the present invention to provide an improved nail-making machine and method for its operation in which the rate of travel of the opposed gripper slide members is less than that of the opposed cutter slide members, said rate of travel varying as a simple harmonic function.

These and other important objects and advantages of the present invention will become more apparent through reference to the ensuing description, appended claims, and accompanying drawings wherein:

Figure 2:
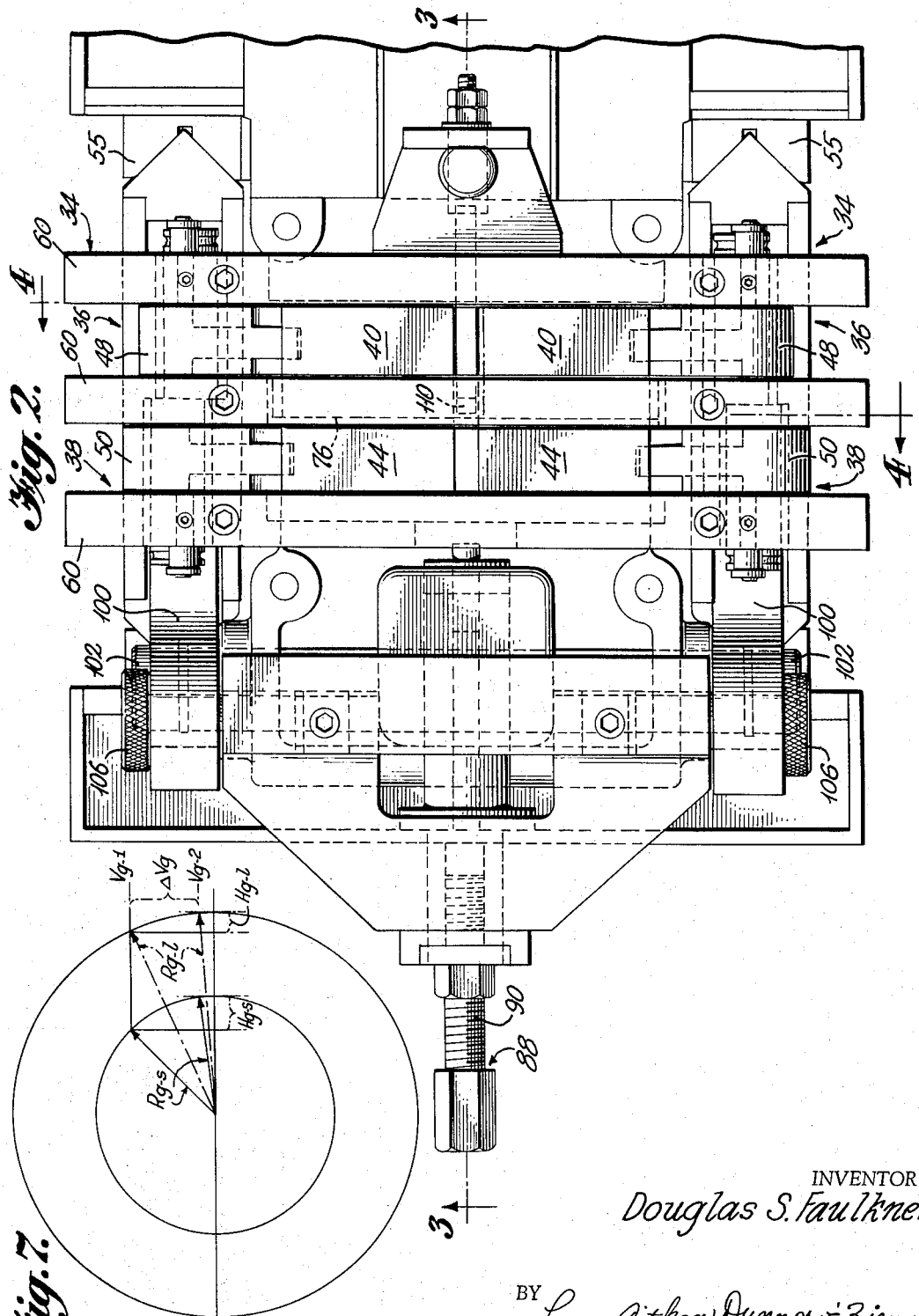
FIG. 2 is a plan view of the nail-making machine proper forming the subject matter of the present invention.
Figure 5:
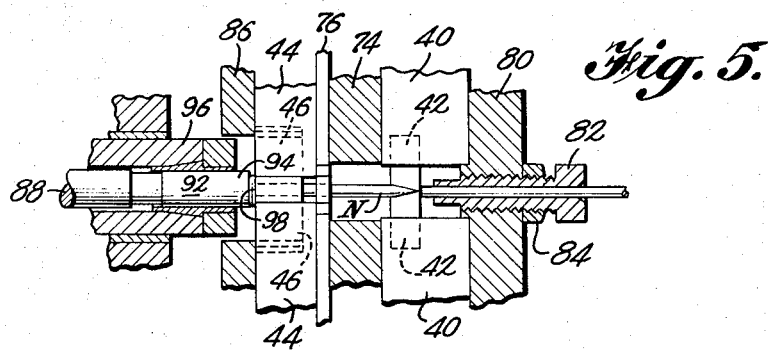

FIG. 4 is a vertical sectional view taken along the line 4—4 of FIG. 2 showing the nail-making mechanism proper with the front end plate 80 and center bridging pieces 60 removed;

FIG. 5 is a horizontal sectional view of the nail-making mechanism proper illustrating the cooperative relationship between the cutter tools, the gripper tools, the centering and stripper guide and the header;

FIG. 6 is a diagrammatic plan view of the nail-making mechanism proper and shows in particular the cutter and gripper mechanism; and FIG. 7 is a diagram illustrating the effect on horizontal travel of a tool holder of variation in the length of its connecting toggle link.

Figure 1:
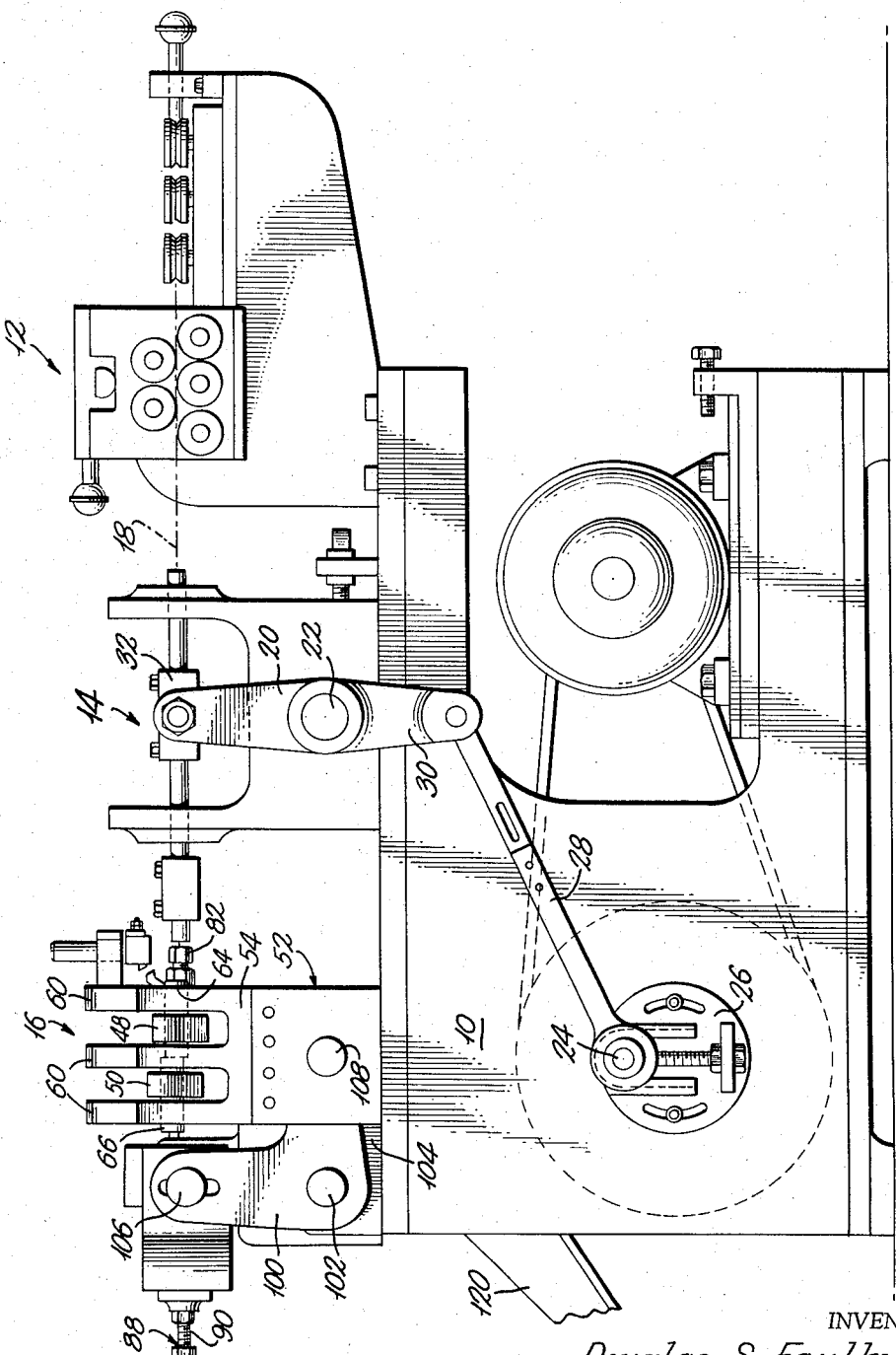
FIGURE 1 is a semi-diagrammatic general arrangement drawing showing the nail-making machine of the present invention in side elevation, together with its associated wire straightening and feeding devices.

The overall nail-making mechanism and associated elements of the machine of the present invention are illustrated semi-diagrammatically in FIG. 1. As shown therein, the mechanism comprises a frame 10 on the upper part of which there is mounted, for successive operation on the wire stock to be made into nails, a wire straightening mechanism 12, a wire feeding mechanism 14 and the nail-making mechanism proper 16.

The wire straightening mechanism 12 is described in detail in a United States application copending herewith entitled "Nail-Making Machine" filed by Douglas S. Faulkner on June 23, 1965 under Ser. No. 466,195. Since this wire straightening mechanism does not form any part of the inventive subject matter of the present application, no purpose would be served by describing its structure at this time. For purposes of completeness of the present specification, the disclosure of said copending U.S. application S.N. 466,195 is hereby incorporated herein by reference.

Similarly, the wire feeding mechanism 14 has been described in great detail in said copending U.S. application S.N. 466,195 and, for purposes of completeness of the present specification, the incorporation of said disclosure herein by reference will serve to provide the details of said wire feeding mechanism. As will be apparent from FIG. 1, the wire feeding mechanism 14 feeds wire stock indicated generally at 18 into the nail-making mechanism proper 16. Operation of the wire feed mechanism 14 is synchronized with the operation of the nail-making machine 16 through arms 20 mounted on a shaft 22 adapted to be rocked from a crank and crank disc mechanism 24, 26 through a connecting rod 28 and an arm 30 fixed to one end of the rock shaft 22. The crank disc 26 is mounted for rotation on the main driving shaft (not shown) of the machine.

As pointed out in said copending U.S. application, wire is led between feed rollers in the wire-feeding mechanism 14 and the arrangement is such that when the feed carriage 32 moves to the right (as viewed in FIG. 1), it makes an idle stroke with respect to the wire, whereas when it moves in the opposite direction said rollers grip the wire by means of a taper grip action and feed an appropriate length of it to the nail mechanism 16 in synchronization with the operation of the latter. Further details of the wire-feeding mechanism 14 and its operation are set forth in British Patent 984,608 and United States Patent 3,109,571, the disclosures of which are hereby incorporated herein by reference.

The nail-making mechanism proper 16 comprises a fixed housing 34 with a central housing block 74 mounted on base casting 104 which in turn is mounted on the frame 10. Frame 10 includes a transverse guideway 36 (see FIG. 2) and, parallel therewith, a further transverse guideway 38. Mounted for reciprocatory movement in a horizontal plane in the guideway 36 are opposed tool holders 40 (alternatively referred to herein as cutter slide members or the like) for the cutter tools 42 (see FIGS. 5 and 6) which cut off the wire stock and point the nail N. Slidably positioned in the guideway 38 are oppositely disposed tool holders 44 (alternatively referred to herein as cutter slide members or the like) which carry the gripper tools 46 (see FIG 6). The tool holders 40 and 44 are reciprocated in the guideways 36 and 38 through toggle links 48 and 50, respectively.

The toggle links 48 and 50 are actuated by a press-like operating mechanism. Details of this press-like operating mechanism are fully disclosed in said U.S. co-pending application Ser. No. 466,195 and are not deemed necessary to be repeated here in view of the incorporation by reference in the present application of the disclosure of said application. Suffice it to say that said press-like operating mechanism is formed of a reciprocating member 52 containing spaced vertically extending limbs 54 which are slidably mounted in vertical guideways 55 (see FIG. 2) provided in a frame part fixedly secured to the main frame 10 to which is attached the nail-making mechanism proper 16 (see FIGS. 1 and 4). A main drive shaft is journalled in the main frame 10. By means of an eccentric or crank mounted on the main drive shaft, reciprocatory movement in a vertical plane is imparted to reciprocating member 52 through a suitable connecting rod assembly.

At their upper ends, the two limbs 54 of reciprocating member 52, which limbs are slotted at 56 and 58 to respectively receive the toggle links 48 and 50 (see FIG. 3), are connected together by bridging pieces 60 (which bridging pieces may, if desired, be formed into a single bridging unit) and have bearings 62 for the shafts 64 and 66 (see FIGS. 4 and 6) which carry the toggle links 48 and 50. At their innermost ends the toggle links are connected to the tool holders 40 and 44 by pivot pins 68 and 70, respectively.

By virtue of the fact that the reciprocating member 52 is constructed of a plurality of limbs 54 which are rigidly secured together at their upper ends by bridging pieces 60 and at their lower ends by means of a cross shaft (not shown) to which the connecting rod joins the reciprocating member 52 to the drive shaft of the machine, the reciprocating member 52 is extremely rigid and, as a result, its life at the high speeds of operation at which this machine can accomplish will be significantly long.

As will be seen particularly by reference to FIGS. 4 and 6, the toggle links 48 for operating the cutter tool holders 40 and the toggle links 50 for operating the gripper tool holders 44 are separately pivotally mounted in the limbs 54 of the reciprocating member 52 by means of the pivot pins 64 and 66. As will also be noted particularly from FIGS. 1 and 6 in the present application, the pivot pins 64 and 66 are out of axial alignment in a vertical plane. This non-vertical alignment of the pivot pin axes serves the purpose of causing the cutting and pointing operation to precede the gripping operation, a sequence which is necessary to the proper operation of the nail-making mechanism of the present invention.

Further details of the cutter and gripper mechanisms and their operation will be set forth below at greater length.

Figure 3:
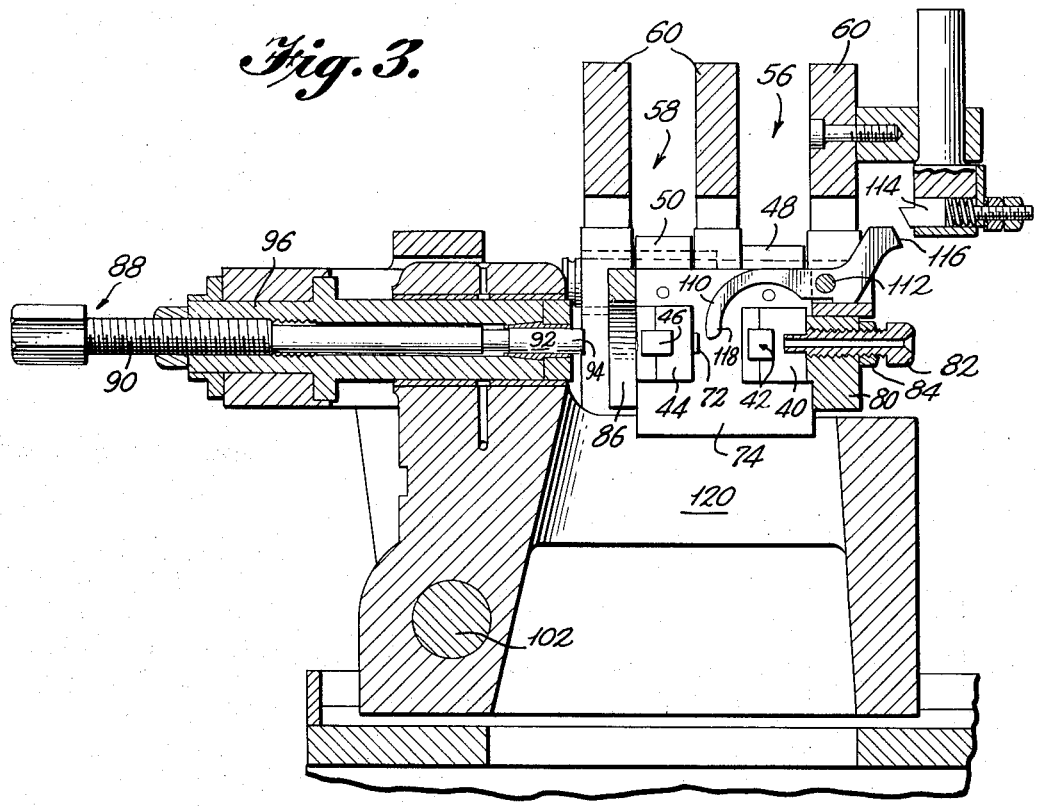
FIG. 3 is a sectional view taken along the line 3—3 of FIG. 2 showing in greater detail the nail-making mechanism proper of the machine of the present invention.

As best shown in FIGS. 3, 4 and 5, mounted in a groove 72 in the central housing block 74 of fixed housing 34 is a wire centering stripper guide 76. (Only groove 72 is shown in FIG. 3, guide 76 having been omited from this figure for means of illustration.) This guide 76 is positioned between tool holders 40 and 44 and, as shown in FIG. 4, is provided with a bevel 78 on its wire entering side facing the front end plate 80 of the machine to facilitate entry of the wire stock. This guide 76 performs the function which was performed by the wire centering guide means included in the mechanism of U.S. Patent 2,696,013 and British Patent No. 715,433 in that it serves to center the wire stock in a horizontal plane before the latter passes between the gripper tools 46 so that the stock will be gripped and headed properly. But guide 76 also serves another significant purpose. More specifically, when newly made gripper tools having freshly made grooves are utilized, the wire stock will often stick to one of the tools when they separate after the heading operation. If this happens, the finished nail will not be ejected properly from the machine and the next succeeding nail to be formed will be crushed into this nail. Faulty nails will be the inevitable result of this operation. The guide 76 avoids this problem by effectively fixing a limit on the extent of lateral movement which can be made by the finished nail as the gripper tools separate, necessarily resulting in the dislodging of any nails sticking to one of the gripper tools after the heading operation.

As shown in FIG. 5, a flared wire entry guide 82 is threaded into front end plate 80 and secured against removal by lock nut 84. The machine also contains a back plate 86 which is shown specifically in FIGS. 3, 5 and 6.

The heading mechanism for the nail (see FIGS. 1, 3 and 5) comprises an elongated member 88 having an externally threaded end portion 90 and a securely held header portion 92 whose end face 94 abuts against the wire stock at the proper point during the operation of the nail-making mechanism to form the nail head. As shown in FIG. 3, the threaded end portion 90 is screwed into a tapped cylindrical receiver 96 to permit the position of the header portion 92 to be longitudinally adjusted relative to the wire stock.

After the nail has been pointed and cut off from the wire stock and while it is being held by the gripper tools 46, the end of the thus pointed and cut nail which protrudes beyond the gripper tools 46 and which is adjacent the face 94 of the header portion 92 is struck by the latter to form the nail head 98.

As will be apparent, the configuration of the head which is formed on the cut wire stock by means of the heading mechanism can be varied by modification of the configuration of the header end face 94 and gripper tools 46.

The header 88 is operated by means of a bellcrank lever 100 (see FIG. 1) pivoted at 102 in a base casting 104 forming a base portion of the nail-making mechanism 16 and which is integrally secured to the main frame 10 of the machine and pivotally attached to the hammer at 106 and to the reciprocating member 52 at 108. Thus, the hammer is operated at the appropriate time in synchronization with the operation of the cutters and grippers by the reciprocating member 52 to head the nail.

To effect positive discharge of the finished nail, an ejector lever 110 (see FIG. 3) is pivotally supported on the end plate 80 of the machine at 112. Mounted on the reciprocating member 52 is a spring loaded catch 114. During downward movement of this reciprocating member to make a nail, the spring-loaded catch 114 slides over the inclined face 116 of the lever 110. During the return, i.e., upward movement of the reciprocating member 52 following the completion of the nail, the catch 114 engages the lever 110 and, as it passes it, rocks the lever so that its end 118 engages the nail and ejects the completed nail into a discharge chute 120.

The operation of the nail-making mechanism proper as immediately described above will be apparent from the foregoing description and through reference to the disclosures of U.S. Patent 2,696,013 and British Patent 715,433. Merely for purposes of illustration of the general operation of the machine, a brief summary of this operation will follow.

Generally speaking, wire stock is fed by the wire-feeding mechanism 14 through wire entry guide 82 to an extent equal to an approximate nail length. At this point, the lead end of the wire stock will project slightly beyond gripper tools 46 and the wire stock will be located in the U-shaped opening of guide 76. In the next step, the wire stock, which is centered by means of the guide 76 and wire entry guide 82, is cut and pointed by means of cutter tools 42, the gripper tools 46 not yet having gripped the lead end of the wire stock so as to permit creep of the wire from the cutting and pointing action. Next, the severed nail length is tightly gripped by gripper tools 46 at a point adjacent its lead end. As will be apparent, the gripper tools 46 will have closed sufficiently about the wire stock before the cutting and pointing operation is completed (though not so tightly as to prevent creep of the wire as above stated) for loosely holding the cut nail to prevent it from dropping out of axial alignment with the gripper groove before the heading operation. The tightly gripped cut wire stock is then headed at its extreme lead end by header 88 and, finally, after opening of the cutter and gripper tools, the thus completed nail is ejected from the machine by means of ejector lever 110. This sequence of operations is then repeated to make additional nails.

As described above, horizontal movement toward and away from one another of the opposed cutter tool holders 40 and gripper tool holders 44 is effected as a result of the vertical reciprocating motion of the reciprocating member 52 by means of a toggle link mechanism. In the operation of a toggle link mechanism such as has been described above, it is extremely desirable that the gripper tools 46 be in contact with the wire stock for a reasonable dwell before and after the dead center position of the gripper toggle links 50 during the course of their reciprocating movement. This dwell period provides a lengthened time during which there is no significant motion of the gripper tool holders 44 sufficient to make them lose their grip on the nail shank during the critical upsetting period when firm gripping is essential.

One way to accomplish this dwell period is to provide a pre-load condition on the gripper tool holders 44 by increasing their length C (see FIG. 6) so that gripping of the wire stock takes place for an increased period of time above and below the dead center position of the gripper toggle links 50. The difficulty with such a pre-load arrangement is that it imposes an extra load on the toggle link mechanism which, in turn, increases the friction loading of the overall nail-making mechanism. To limit structural stress and possible overheating caused by this condition, it is necessary to impose a limit on the rate of nail production of the machine significantly below its theoretical capacity to operate.

In accordance with the present invention, the advantages of pre-loading (viz., a significant dwell in the lateral movement of the gripper tool holders 44 above and below the dead center position of the gripper toggle links 50) without its significant disadvantages is quite effectively accomplished. This is done as shown clearly in FIGS. 4 and 6 by increasing the lengths A of the opposed gripper toggle links 50 as compared with the lengths B of the opposed cutter toggle links 48. In accordance with this arrangement, the pivot pins 66 pivotally connecting the gripper toggle links 50 to the reciprocating member 52 (through limbs 54 as shown in FIG. 6) are axially offset in a horizontal plane with respect to the corresponding pivot pins 64 pivotally connecting the cutter toggle links 48 to said reciprocating member. (This axial offsetting is in addition to the vertically axial offsetting referred to previously.) The significance of this arrangement will become clearer upon an understanding of the basic nature of the mechanism involved.

The toggle link mechanism used herein permits the vertical motion of reciprocating member 52 to be translated into horizontal motion of cutter tool holders 40 and gripper tool holders 44 through the direct agency of the toggle links 48 and 50, respectively. As will be apparent from the foregoing description, the paths traversed by pivot pins 64 and 66 (which connect the toggle links to the reciprocating member 52) are linear. Notwithstanding this fact, the rate of horizontal travel of the cutter tool holders 40 and gripper tool holders 44 is, by virtue of the nature of the mechanism, sinusoidal in its character in that its value is very low (viz., zero) at the point at which its connecting toggle link is in its dead-center position and at a maximum when such toggle link is at its extreme high position of vertical movement. Stated differently, the horizontal rates of travel of the cutter and gripper tool holders 40 and 44 vary as a simple harmonic function, the horizontal rate of travel of one such tool holder being represented at any given time by the horizontal projection of the effective length of its toggle link along the axis of movement of said tool holder. The longer the length of the toggle link used, the longer is the radius of the circle by which the harmonic function is measured and, accordingly, the lower the differential in the values of the horizontal rates of travel of such tool holder for a given vertical movement of said connecting toggle link. By virtue of this fact, the longer the connecting toggle link, the slower will the horizontal rate of travel be for the tool holder to which it is connected.

This may readily be seen by reference to FIG. 7, which clearly illustrates the effect of a variation in the length of a toggle link on the horizontal rate of travel of the tool holder to which it is connected. Shown in FIG. 7 are radii of each of two concentric circles. The small radii, identified by "$R_{g-s}$" and representing the distance between pivot points of a gripper toggle link (corresponding to length A in FIG. 6), illustrate what effectively happens when the reciprocating member to which such link is attached moves vertically through a distance $\Delta V_g$ from a position $V_{g-1}$ to a lower position $V_{g-2}$. Similarly, the large radii, identified by "$R_{g-1}$" and representing the distance between pivot points of a gripper toggle link similar to but larger than the "$R_{g-s}$" toggle link, illustrate what effectively happens when the reciprocating member to which such larger link is attached moves vertically through said distance $\Delta V_g$ from a position $V_{g-1}$ to a lower position $V_{g-2}$.

As will be readily apparent from the foregoing discussion in which it was pointed out that the horizontal rates of travel of the cutter and gripper tool holders 40 and 44 vary as a simple harmonic function, the distance $H_{g-s}$ represents the horizontal distance that the gripper tool holder connected to the "$R_{g-s}$" toggle link will have moved between the points $V_{g-1}$ and $V_{g-2}$ and, similarly, the distance $H_{g-1}$ represents the horizontal distance that the gripper tool holder connected to the "$R_{g-1}$" toggle link will have moved between the points $V_{g-1}$ and $V_{g-2}$. Since $H_{g-1}$ is measurably smaller than $H_{g-s}$, it will be readily seen, therefore, that for a given vertical movement of the reciprocating member, a greater horizontal distance will be travelled by a tool holder connected to a short toggle link than by such a tool holder connected to a longer toggle link. Stated differently, the rate of travel of the former tool holder towards and away from the wire stock will be greater than that of the latter tool holder.

As a result of the foregoing, it will be seen that by making the gripper toggle links 50 longer than the cutter toggle links 48, the result is a situation in which the rate of travel of the cutter tool holders 40 towards and away from one another upon reciprocation of the reciprocating member 52 is faster than that of the gripper tool holders 44. As a result, only a short portion of the working cycle of the mechanism is used for the cutting and pointing period, leaving a materially increased portion of the working cycle available for the gripping and heading operations. The result is the production of improved quality nails and a higher rate of and more efficient production for reasons previously enumerated.

Furthermore, it was previously pointed out that it was desired to provide a dwell period in the horizontal movement of the gripper tool holders 44 for a reasonable period before and after the dead-center position of the gripper toggle links 50 during the course of their reciprocating movement. The toggle link construction of the present invention provides such a dwell period in that the horizontal motion of the gripper tool holders 44, which varies in accordance with the harmonics of a circle, is approaching zero at the dead center position of the gripper toggle links 50, viz., at the time the maximum delay or dwell is desired.

It will be appreciated from what has been stated above that it is desirable in the practice of the present invention that the gripper toggle links 50 should, within reason, be made as long as possible and, correspondingly, that the cutter toggle links 48 be made as short as possible within reason. An arrangement which has been found to be quite satisfactory is one in which, using 8 to 12 gauge (S.W.G.) wire to make nails having a length of 2–3″, gripper toggle links having a length between pivot pins of approximately 1¾″ and cutter toggle links having a length between pivot pins of approximately 1½″ are utilized.

It might be contemplated that the foregoing variations in the respective rates of travel as between the gripper and cutter tool holder mechanisms could be effectuated through the use of appropriately profiled cams such as are used, for example, for the operation of orthodox nail-making machines. (See, for example, U.S. Patent No. 2,767,411, especially FIG. 7.) The difficulty associated with the use of such cams, however, is that they are severely limited by the speed at which a cam follower can maintain its contact with the cam, a factor which imposes a severe limitation on the speed and efficiency of operation of the nail-making mechanism, a limitation not present in connection with the structure and method of the present invention.

In effect, the operation used in the present application is the reciprocation of a link above and below an axis, the arc of oscillation of the link being a maximum of 90°. By keeping the angle of the link with the axis less than 45°, one is in effect converting that component of the vertical vector of the radius of the link (which is at its maximum vertical displacement per degree of arc) to the horizontal vector of the radius of the link (the actual movement of the tool holder) which horizontal displacement is at its minimum (approaching zero) for each same degree of arc used for the vertical displacement.

While the novel mechanism and method of operation of the foregoing nail-making machine have been described with reference to a particular press of the type shown in the drawings and described in said copending U.S. application Ser. No. 466,195, it will be readily apparent to those skilled in the art that such mechanism and method may be advantageously employed in connection with any conventional power press.

When reference is made in this specification or claims to nails or nail-making, it is intended to embrace not only the making of nails but of rivets and other formed and headed shapes.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A nail-making machine having a first member; a second member which is reciprocally mounted relative to said first member along a first axis of movement; means for reciprocating said second member; a first pair of opposed cutter slide members slidable in said first member towards and away from one another in a direction substantially normal to said first axis of movement; a second pair of opposed gripper slide members slidable in said first member towards and away from one another in a direction substantially normal to said first axis of movement; a toggle link member for each one of said cutter slide members; a toggle link member for each of said gripper slide members; each of said toggle link members being pivotally connected to one of said slide members and to said second member so that upon reciprocation of said second member said cutter and gripper slide members are caused to move towards and away from one another in said substantially normal direction; the gripper slide toggle link members being longer than said cutter slide toggle link members; the pivot point at which each of said gripper slide toggle link members is connected to said second member being further removed from the mid-point between said opposed gripper slide members than the pivot point at which each of said cutter slide toggle link members is connected to said second member is removed from the mid-point between said opposed cutter slide members.

2. A machine as defined in claim 1 wherein the pivotal connection of said toggle links to said second member permits a maximum arc of oscillation of said toggle links of 90° and an angle between the axis of said toggle links and the axis of movement of the cutter and gripper slide members to which they are attached of no greater than 45°.

3. A method of manufacturing wire nails comprising,
   (a) feeding wire nail stock into a nail making machine wherein a second member is reciprocated relative to a first member for actuating a header and causing a pair of opposed cutter slide members to move in said first member towards and away from each other while simultaneously causing a pair of opposed gripper slide members to move towards and away from each other but at a rate of travel less than that at which said cutter slide members move towards and away from each other, the rate of travel of said cutter and gripper slide members varying as a simple harmonic function;
   (b) moving each pair of opposed cutter and gripper slide members away from each other;
   (c) advancing an approximate nail length of the wire nail stock between the cutter and gripper slide members;
   (d) moving the pair of cutter slide members towards each other to sever the advanced length of wire;
   (e) moving the pair of gripper slide members towards each other to grip the severed wire nail stock;
   (f) heading the extreme front end of the gripped nail length;
   (g) while heading the nail length, moving the pair of cutter slide members away from the gripped, severed nail length; and
   (h) while heading the nail length, moving the pair of gripper slide members away from the headed, severed nail length.

4. In a nail-making machine having a second member reciprocally mounted relative to a first member; a pair of opposed cutter slide members mounted for sliding movement in said first member towards and away from one another; a pair of opposed gripper slide members mounted for sliding movement in said first member towards and away from one another; means connecting said opposed cutter and gripper slide members to said second member for effecting said sliding movement of said cutter slide members in synchronization with said sliding movement of said gripper slide members upon reciprocation of said second member; and means for causing said gripper slide members to move towards and away from one another upon reciprocation of said second member at a rate of travel less than that at which said cutter slide members move towards and away from one another, the rates of travel of said cutter and gripper slide members varying as a simple harmonic function.

5. A nail-making machine as defined in claim 4 wherein said last-mentioned means comprises toggle links.

6. A nail-making machine as defined in claim 4 wherein said last-mentioned means comprises toggle links; one toggle link pivotally connecting each of said cutter slide and gripper slide members to said second member; the toggle links for said gripper slide members being longer than the toggle links for said cutter slide members; the pivot point at which each of said gripper slide toggle links is connected to said second member being further removed from the mid-point between said opposed gripper slide members than the pivot point at which each of said cutter slide toggle links is connected to said second member is removed from the mid-point between said opposed cutter slide members.

7. A nail-making machine as defined in claim 6 wherein the pivotal connection of said toggle links to said second member permits a maximum arc of oscillation of said toggle links of 90° and an angle between the axis of said toggle links and the axis of movement of the cutter and gripper slide members to which they are attached of no greater than 45°.

8. A nail-making machine as defined in claim 6 wherein the pivotal connection of said toggle links to said second member permits a maximum arc of oscillation of said toggle links of 90° and an angle between the axis of said toggle links and the axis of movement of the cutter and gripper slide members to which they are attached of no greater than 45°, the rate of travel of each of said cutter and gripper slide members towards one another approaching zero as the toggle link to which it is connected approaches a position in axial alignment with the axis of movement of said slide member to which it is connected.

References Cited
UNITED STATES PATENTS

| 2,381,171 | 8/1945 | Little et al. | 10—49 |
| 2,696,013 | 12/1954 | Theodore | 10—50 |

LEONIDAS VLACHOS, *Primary Examiner.*